(12) United States Patent
Luik et al.

(10) Patent No.: US 9,352,402 B2
(45) Date of Patent: May 31, 2016

(54) CUTTING TOOL FOR MACHINING A WORKPIECE

(71) Applicant: HARTMETALL-WERKZEUGFABRIK PAUL HORN GMBH, Tuebingen (DE)

(72) Inventors: Matthias Luik, Reutlingen (DE); Matthias Oettle, Bodelshausen (DE)

(73) Assignee: HARTMETALL-WERKZEUGFABRIK PAUL HORN GMBH, Tuebingen (DE)

( * ) Notice: Subject to any disclaimer, the term of this patent is extended or adjusted under 35 U.S.C. 154(b) by 239 days.

(21) Appl. No.: 13/912,265

(22) Filed: Jun. 7, 2013

(65) Prior Publication Data

US 2013/0272807 A1    Oct. 17, 2013

Related U.S. Application Data

(63) Continuation of application No. PCT/EP2011/070811, filed on Nov. 23, 2011.

(30) Foreign Application Priority Data

Dec. 7, 2010    (DE) .......................... 10 2010 054 392

(51) Int. Cl.
*B23C 5/08*    (2006.01)
*B23C 5/22*    (2006.01)
(Continued)

(52) U.S. Cl.
CPC ............... *B23C 5/2295* (2013.01); *B23C 5/006* (2013.01); *B23C 5/109* (2013.01); *B23C 5/28* (2013.01); *B23C 5/08* (2013.01); *B23C 5/22* (2013.01); *B23C 2210/02* (2013.01);
(Continued)

(58) Field of Classification Search
CPC ...... B23C 5/08; B23C 5/22; B23C 2210/244; Y10T 409/309632; Y10T 407/1092; Y10T 407/1944; Y10T 403/7039; Y10T 403/7098
USPC ...................... 409/236; 407/31, 52; 83/425.3; 144/218, 231–235, 237
See application file for complete search history.

(56) References Cited

U.S. PATENT DOCUMENTS 53,496 A * 3/1866 Smith .............................. 407/31
349,475 A * 9/1886 Barclay ........................... 407/64
(Continued)

FOREIGN PATENT DOCUMENTS

DE    26 30 047      1/1978
DE    102 22 446    12/2003
(Continued)

*Primary Examiner* — Sunil K Singh
*Assistant Examiner* — Ryan Rufo
(74) *Attorney, Agent, or Firm* — Saliwanchik, Lloyd & Eisenschenk

(57) ABSTRACT

A cutting tool for machining a workpiece. The cutting tool comprises a holder and at least two cutting inserts which are separated from each other by a spacer element. The cutting tool may be used to produce two or more bevels (and/or joints and/or grooves) at precisely defined spacings in only one operation. Through the use of spacer elements of different lengths, it is possible to produce bevels at different spacings. The spacer element preferably has an interface which comprises only radial contact surfaces, which run parallel to a longitudinal axis of the spacer element, and a substantially flat axial contact surface, which runs transverse to the longitudinal axis. The length of the spacer element can therefore be shortened on the rear side of the spacer element without destroying said interface.

13 Claims, 6 Drawing Sheets

(51) Int. Cl.
  *B23C 5/10* (2006.01)
  *B23C 5/00* (2006.01)
  *B23C 5/28* (2006.01)

(52) U.S. Cl.
  CPC ...... *B23C 2210/03* (2013.01); *B23C 2210/244* (2013.01); *B23C 2265/32* (2013.01); *Y10T 407/14* (2015.01); *Y10T 407/1902* (2015.01); *Y10T 407/2208* (2015.01); *Y10T 407/23* (2015.01); *Y10T 407/28* (2015.01)

(56) References Cited

U.S. PATENT DOCUMENTS

| | | | |
|---|---|---|---|
| 1,725,299 A * | 8/1929 | Pickin | 175/295 |
| 2,282,596 A * | 5/1942 | Wise et al. | 175/412 |
| 2,369,273 A * | 2/1945 | Bakewell | 408/222 |
| 3,577,809 A * | 5/1971 | Brandl et al. | 408/186 |
| 3,986,543 A * | 10/1976 | Slayton et al. | 144/236 |
| 4,103,588 A | 8/1978 | Schmid | |
| 5,309,962 A * | 5/1994 | McCord et al. | 144/237 |
| 5,607,263 A | 3/1997 | Nespeta et al. | |
| 6,568,442 B1 * | 5/2003 | Meugniot | 144/371 |
| 6,896,450 B2 * | 5/2005 | Rothenstein | 408/59 |
| 7,189,039 B2 * | 3/2007 | Pantzar | 409/234 |
| 7,325,471 B2 * | 2/2008 | Massa et al. | 82/1.11 |
| 7,537,422 B2 * | 5/2009 | Ballas et al. | 409/136 |
| 2005/0169723 A1 | 8/2005 | Schafer et al. | |
| 2005/0232710 A1 * | 10/2005 | Schafer et al. | 407/47 |
| 2007/0067979 A1 * | 3/2007 | Zumsteg et al. | 29/558 |
| 2012/0321397 A1 * | 12/2012 | Sjoo | 407/29 |

FOREIGN PATENT DOCUMENTS

| | | | |
|---|---|---|---|
| DE | 102004023710 A1 * | 12/2005 | B23C 5/1054 |
| DE | 102005034426 A1 * | 12/2006 | B23B 2251/02 |
| DE | 102008015582 A1 * | 3/2008 | B23C 5/10 |
| DE | 10 2007 001 864 | 7/2008 | |
| DE | 102011055210 A1 * | 5/2013 | B23G 5/18 |
| WO | WO-2006/136338 | 12/2006 | |
| WO | WO-2008-083818 | 7/2008 | |

\* cited by examiner

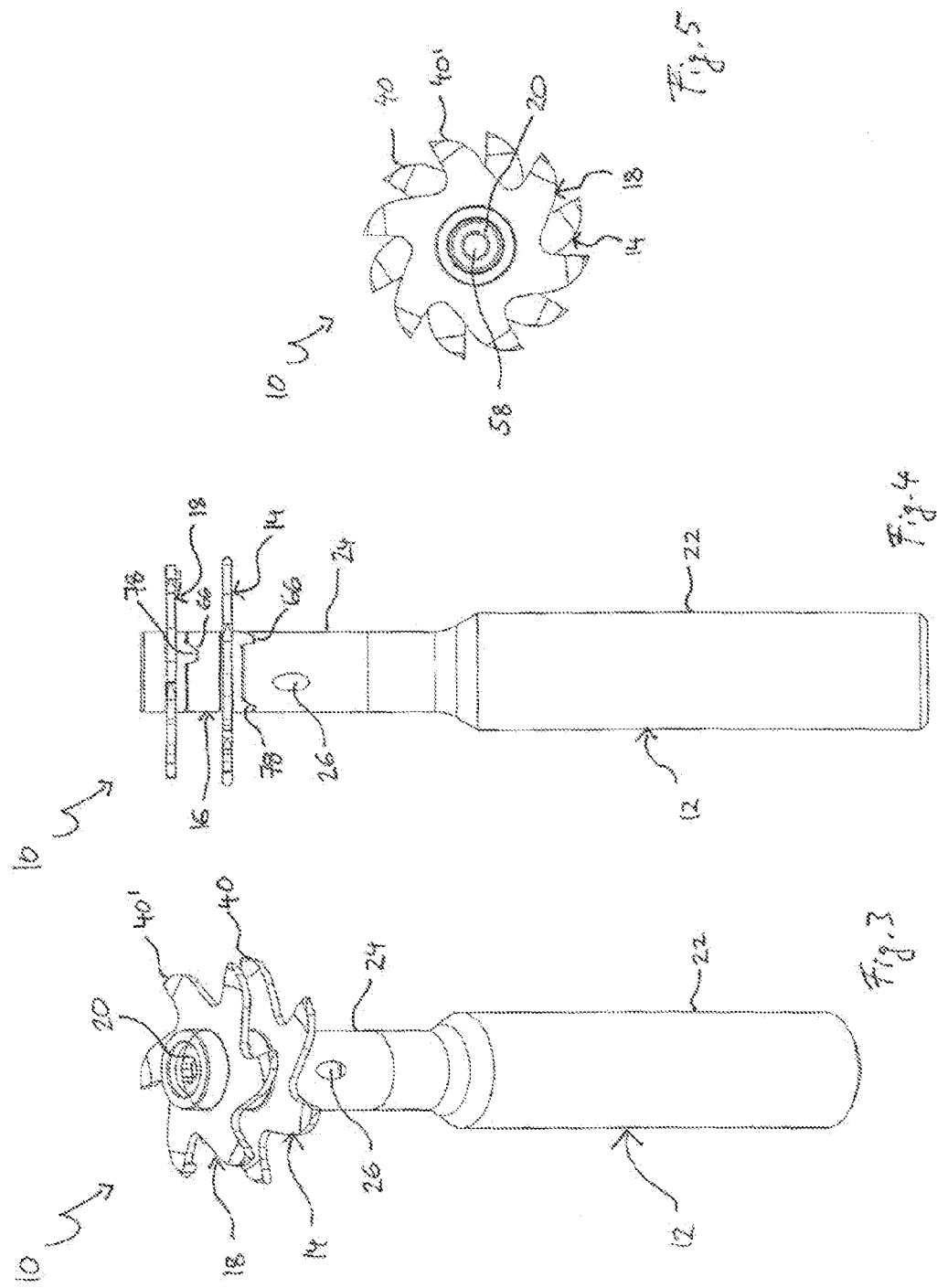

CUTTING TOOL FOR MACHINING A WORKPIECE

CROSS-REFERENCE TO RELATED APPLICATIONS

This application is a continuation of international patent application PCT/EP2011/070811, filed on Nov. 23, 2011 designating the U.S., which international patent application has been published in German language and claims priority from German patent application DE 10 2010 054 392.6, filed on Dec. 7, 2010. The entire contents of these priority applications are incorporated herein by reference.

BACKGROUND OF THE INVENTION

The disclosure relates to a cutting tool for machining a workpiece. Further, the disclosure relates to a cutting insert for such a cutting tool. Still further, the disclosure relates to a spacer element for such a cutting tool.

DE 102 22 446 A1 shows an exemplary cutting tool and corresponding cutting insert of this type. Such tools are used, for example, for the milling of bevels. In metal working, in particular, the deburring or beveling of a surface is of great importance. In beveling, the sharp edges of workpieces are chamfered, whereby the risk of injury is reduced. A variety of cutting inserts can be used to create bevels. A frequent objective in the creation of bevels is that a bevel should be produced both on the top side and on the bottom side of a workpiece. Since traditional cutting tools generally have only one cutting insert, the bevels on the top and bottom side of the workpiece have hitherto had to be produced in two operations. The effort involved in creating two opposite-situated bevels is thus significantly greater than the effort involved in creating just one bevel. The same applies to the creation of grooves and joints. Another frequent objective is that bevels, grooves or joints should be made on a plurality of stackable workpieces.

SUMMARY OF THE INVENTION

It is therefore an object to provide a cutting tool with which two or more bevels, grooves and/or joints can be produced simultaneously. In addition, it is an object to provide a spacer element and a cutting insert for such a cutting tool.

In view of this object, there is provided a cutting tool for machining a workpiece, comprising:
  a holder having a central holder bore that extends along a longitudinal axis, and having a first interface that is arranged at a front end of the holder;
  a first cutting insert having a second interface, which is arranged at a rear side of the first cutting insert and corresponds to the first interface, for coupling the first cutting insert to the holder, and having a third interface that is arranged at a top face of the first cutting insert opposite the rear side of the first cutting insert;
  a spacer element having a fourth interface, which is arranged at a rear side of the spacer element and corresponds to the third interface, for coupling the spacer element to the first cutting insert, and having a fifth interface that is arranged at a top face of the spacer element opposite the rear side of the spacer element,
  a second cutting insert having a sixth interface, which is arranged at a rear side of the second cutting insert and corresponds to the fifth interface, for coupling the second cutting insert to the spacer element;
  at least one fastening element for fastening together the two cutting inserts, the spacer element and the holder, wherein each of the first cutting insert, the second cutting insert and the spacer element have a central bore, coaxial to the central holder bore, for the reception of the at least first fastening element;
wherein the fourth interface is configured to engage the third interface with at least one radial contact surface, which runs parallel to the longitudinal axis and is configured to fix the spacer element in radial direction, and with a substantially flat axial contact surface, which runs transverse to the longitudinal axis and fixes the spacer element in axial direction, such that the spacer element can be shortened at its rear side, and yet the fourth interface continues to correspond to the third interface.

According to a further aspect, there is provided a cutting insert for a cutting tool, said cutting tool having a holder with a first interface that is arranged at a front end of the holder, the cutting insert comprising:
  a second interface, which is arranged at a rear side of the cutting insert and corresponds to the first interface of the holder, for coupling the cutting insert to the holder;
  a third interface, which is arranged at a top face of the cutting insert opposite the rear side of the cutting insert, for coupling the cutting insert to a corresponding fourth interface;
  a central through bore that extends along a longitudinal axis; and
  at least one cutting element arranged on a periphery of the cutting insert;
wherein the third interface comprises at least one radial contact surface, which runs parallel to the central through bore, and a substantially flat axial contact surface, which is arranged perpendicular to the longitudinal axis.

According to a still further aspect, there is provided a spacer element for a cutting tool, said cutting tool having a holder, a first and a second cutting insert, wherein the holder has a first interface that is arranged at a front end of the holder, wherein the first cutting insert has a second interface, which is arranged at a rear side of the first cutting insert and corresponds to the first interface of the holder, and a third interface that is arranged at a top face of the first cutting insert opposite the rear side of the first cutting insert, and wherein the second cutting insert has a sixth interface, which is arranged at a rear side of the second cutting insert, the spacer element comprising:
  a fourth interface, which is arranged at a rear side of the spacer element and corresponds to the third interface, for coupling the spacer element to the first cutting insert;
  a fifth interface that is arranged at a top face of the spacer element opposite the rear side of the spacer element, for coupling the spacer element to the second cutting insert; and
  a central through bore that extends along a longitudinal axis;
wherein the fourth interface comprises at least one radial contact surface, which runs parallel to the longitudinal axis, and a substantially flat axial contact surface, which runs transverse to the longitudinal axis, such that the spacer element can be shortened at its rear side, and yet the fourth interface continues to correspond to the third interface.

The spacer element with its two oppositely disposed interfaces enables the torque to be relayed from the holder via the first cutting insert and the spacer element to the second cutting insert, and further enables the second cutting insert to be guided at an exactly defined distance from the first cutting insert and coaxially to the first cutting insert. It is thus hereby possible to produce two or more bevels (and/or joints and/or grooves) at precisely defined spacings in one operation. It is also an advantage of the cutting tool that, through the use of spacer elements of different lengths, it is possible to produce bevels at different spacings. A further advantage is that, by coupling a plurality of coupling plates and spacer elements, it is also possible to produce more than two bevels in one operation. In addition, it is possible for the spacer element to be removed and for only the second cutting insert be attached directly to the holder.

Since the fourth interface of the spacer element comprises only radial contact surfaces, which run parallel to the longitudinal axis, and a substantially flat axial contact surface, which runs transverse to the longitudinal axis, the length of the spacer element can be shortened on the rear side of the spacer element, and yet the fourth interface continues to correspond to the third interface. It is hereby possible, even if spacer elements are mass produced only in certain lengths, for the spacer elements to be shortened individually, for instance by turning. As a result, optional spacings between the cutting inserts are realizable.

In a refinement, the first and the fifth interface are configured to be substantially the same. It is thereby possible for traditional cutting inserts, which can be mounted directly onto the holder, to be coupled to the presented spacer element and thus to be used, in the presented cutting tool as a second cutting insert. Previously known holders can likewise be used for the presented cutting tool. "Substantially the same" should thus be taken to mean that the interfaces themselves do not have to be of perfectly identical configuration, but rather those elements of the interface which are relevant to the force transmission and to the coupling of the components to be coupled together, such as, for instance, the number, position and orientation of ribs and thereto corresponding joints.

Alternatively, in a further refinement, the first interface does not correspond to the fifth interface. It is hereby possible for the first and fifth interface to be adapted to a particular requirement of the first and second cutting insert. For example, the second cutting insert could be a three-edged cutting insert, and the first cutting insert a five-edged cutting insert. These cutting inserts could require different corresponding interfaces, which would be possible in this refinement.

In a further refinement, the first and fifth interface are placed twisted relative to each other about the holder longitudinal axis. In this refinement, the cutting elements of the first and second cutting insert are arranged mutually offset in the radial direction.

A peripherally offset (twisted) positioning of the cutting elements of the first and second cutting insert has the advantage that a better force distribution is achieved. This can be achieved by virtue of the fact that the two cutting inserts have a different offset relative to the interfaces. Alternatively, the cutting elements can be equally positioned relative to the interfaces of the cutting inserts, and the offset can be achieved by a mutually twisted, radial alignment of the interfaces.

In a further refinement, the holder bore has an internal thread, the fastening element is a screw having a corresponding external thread, and all bores are through bores. The first cutting insert, the second cutting insert and the spacer element can hence be fastened in a particularly simple and stable manner with a screw. Similarly, a simple exchange of the spacer element is possible.

In a further refinement, the cutting tool has precisely one spacer element. This has the advantage that the second cutting insert can be fastened with particularly high precision relative to the first cutting insert, since tolerances of a plurality of spacer elements are not added together.

In a further refinement, the cutting tool has alternately a plurality of spacer elements and a plurality of first cutting inserts. It is hereby possible for more than two cutting inserts to be able to be fitted at defined spacings, and thus for also more than two bevels, joints and/or grooves to be able to be produced simultaneously.

In a further refinement, the fifth interface of the spacer element corresponds to the fourth interface, so that a plurality of spacer elements can be coupled to one another. In much the same way as with plug-in modular components, different spacings can thus be realized by the simple attachment of spacer elements. By combining spacer elements of different length, it is thus possible to realize optional spacings between the cutting inserts by simple plugging together.

In a further refinement, the third interface has three radial faces, which form an angle of 60° to one another. This enables particularly stable fastening.

In a further refinement, the fastening element has an inner bore for the supply of coolant and/or for the lead-through of a second fastening element. Advantageously, radially disposed openings in the fastening element can be used to supply coolant to different cutting inserts.

It is to be understood that the aforementioned features and the following features which are yet to be described can be used not only in the respectively stated combination, but also in other combinations, or in isolation, without departing from the spirit of the invention.

BRIEF DESCRIPTION OF DRAWINGS

Exemplary embodiments are illustrated in the drawings and will be ex-plained in greater detail in the following description. In the drawings:

FIG. 3 shows a representation of the assembled cutting tool,

FIG. 4 shows a representation of the assembled cutting tool from another perspective, FIG. 5 shows a representation of the assembled cutting tool, viewed from the side facing toward the workpiece.

DESCRIPTION OF PREFERRED EMBODIMENTS

Figure 1A:
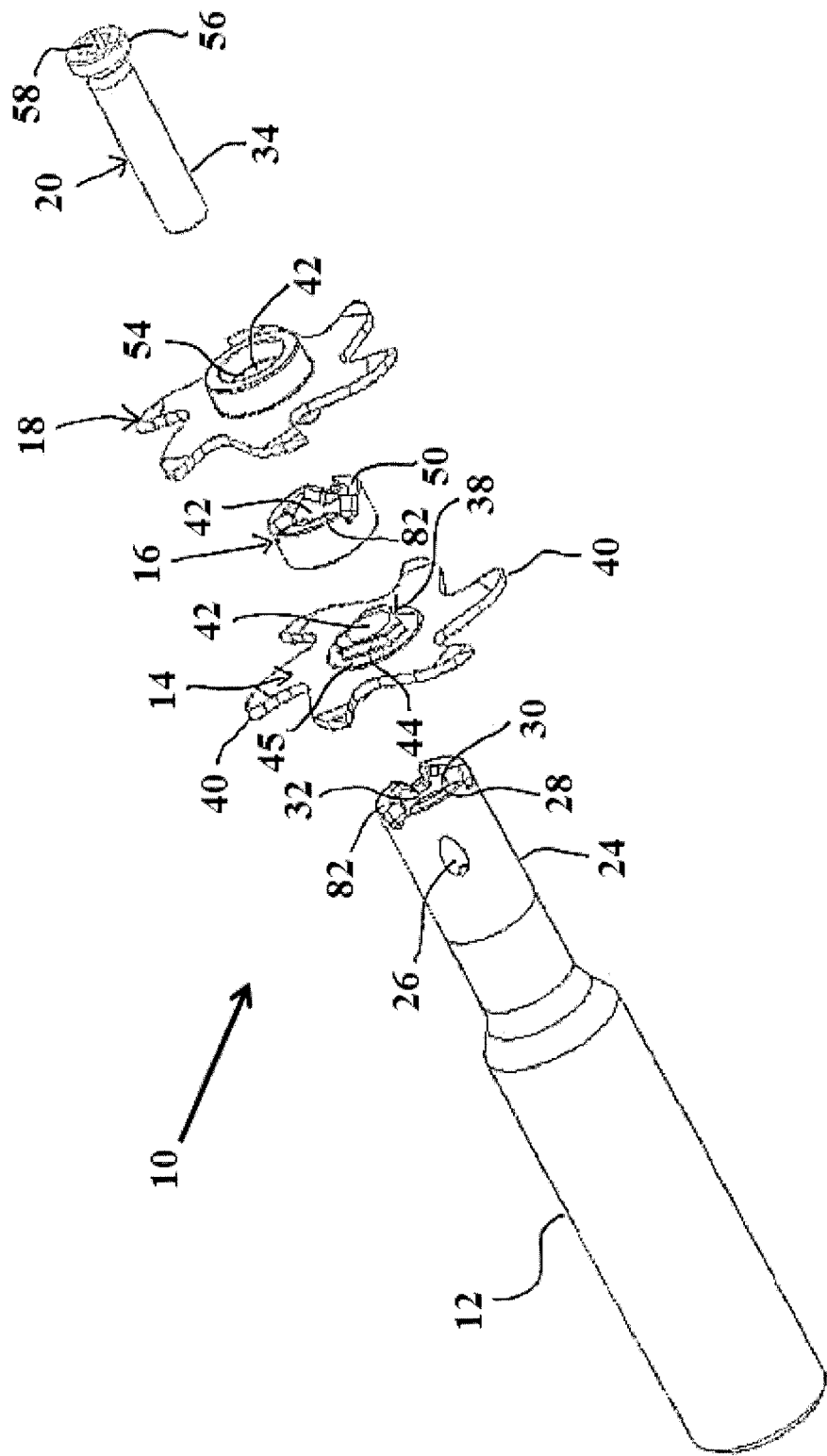
FIG. 1A shows an exploded representation of an embodiment of the cutting tool comprising holder, first cutting insert, spacer element, second cutting insert, and fastening element.

FIGS. 1A-1B and 2A-2B show the cutting tool 10, which has a holder 12, a first cutting insert 14, a spacer element 16, a second cutting insert 18 and a fastening element 20. The holder 12 here comprises a holder base part 22 and a soldered-on part 24, but can also in principle be configured in one piece. The soldered-on part 24 has a plurality of holes 26 for the supply of coolant. At that end of the soldered-on part which is nearest to the workpiece is disposed, on the end face, a first interface 28. The axially parallel holder bore 30 runs axially through the holder. At that end of the axially parallel holder bore, which is nearest to the workpiece, an internal thread 32 is disposed, so that the fastening element 20, which is realized as a screw and has an external thread 34, can be screwed to the holder 12. In this example, the first interface 28 is configured to be the same as the fifth interface 50, which is shown in detail in FIG. 7.

The first cutting insert 14 has a second interface 36 on the side facing toward the holder. Said second interface 36 corresponds to the first interface 28. A third interface 38 is arranged on the side of the first cutting insert 14 that faces away from the holder 12. Further, the first cutting insert 14 comprises a plurality of cutting elements 40, which extend in radial direction and which are distributed over the periphery of the first cutting insert 14. In this embodiment a cutting insert 14 having six cutting elements 40 is shown, but the number can be chosen differently according to the desired machining. Running through the cutting insert 14 is a bore 42 coaxial with the holder bore 30. The third interface 38 has three radial contact surfaces 44 which are directed in a radially outward direction. The radial contact surfaces 44 stand at an angle of 60° to one another. The third interface 38 further comprises an axial contact surface 45.

A fourth interface 46 is arranged on the side of the spacer element 16 that faces toward the holder 12. The fourth interface 46 has three inwardly directed radial contact surfaces 48, running in the direction of the holder longitudinal axis. The inwardly directed radial contact surfaces 48 likewise stand at an angle of 60° to one another. On the side of the spacer element 16 which is facing away from the holder 12, a fifth interface 50 is provided. Since the second interface 36 corresponds to the fifth interface 50, a further cutting insert of the type of the first cutting insert, and a further spacer element, can be inserted between the spacer element 16 and the second cutting insert 18. Through the addition of further first cutting inserts and spacer elements, a cutting tool 10 for the simultaneous performance of a plurality of cutting operations (for example creation of more than two bevels, joints and/or grooves) can thus be formed.

Unlike the cutting tool shown in the figures, the fourth and fifth interface 46, 50 of the spacer element can also be designed such that they correspond to each other. A plurality of such spacer elements can thus be coupled to one another and greater spacings between the first and second cutting insert 14, 18 can be realized.

On the side of the second cutting insert 18 which is facing toward the holder 12, a sixth interface 52 is provided. Distributed in the peripheral direction, cutting elements 40' are found on the second cutting insert 18. These are arranged offset relative to the cutting elements 40 of the first cutting insert 14. This is achieved by virtue of the fact that the fifth interface 50 (corresponding to the first interface 28) is twisted in comparison to the first interface 28 correspondingly in the peripheral direction. A contact surface 54 is arranged on the side facing away from the holder 12. Against this contact surface 54, the head 56 of the fastening element 20 can be placed.

The screw (the fastening element) 20 comprises an external thread 34. The screw 20 is sufficiently long that it can be guided through the bores, coaxial with the holder bore 30, of the first cutting insert 14, spacer element 16 and second cutting insert 18 and can be screwed to the internal thread 32 of the holder bore 30. For this purpose, referring to the embodiment shown in FIG. 1A and FIG. 2A, at that end of the screw 20 which is nearest to the workpiece a tool engagement member 58, for example for a Torx wrench, is provided.

Figure 1B:
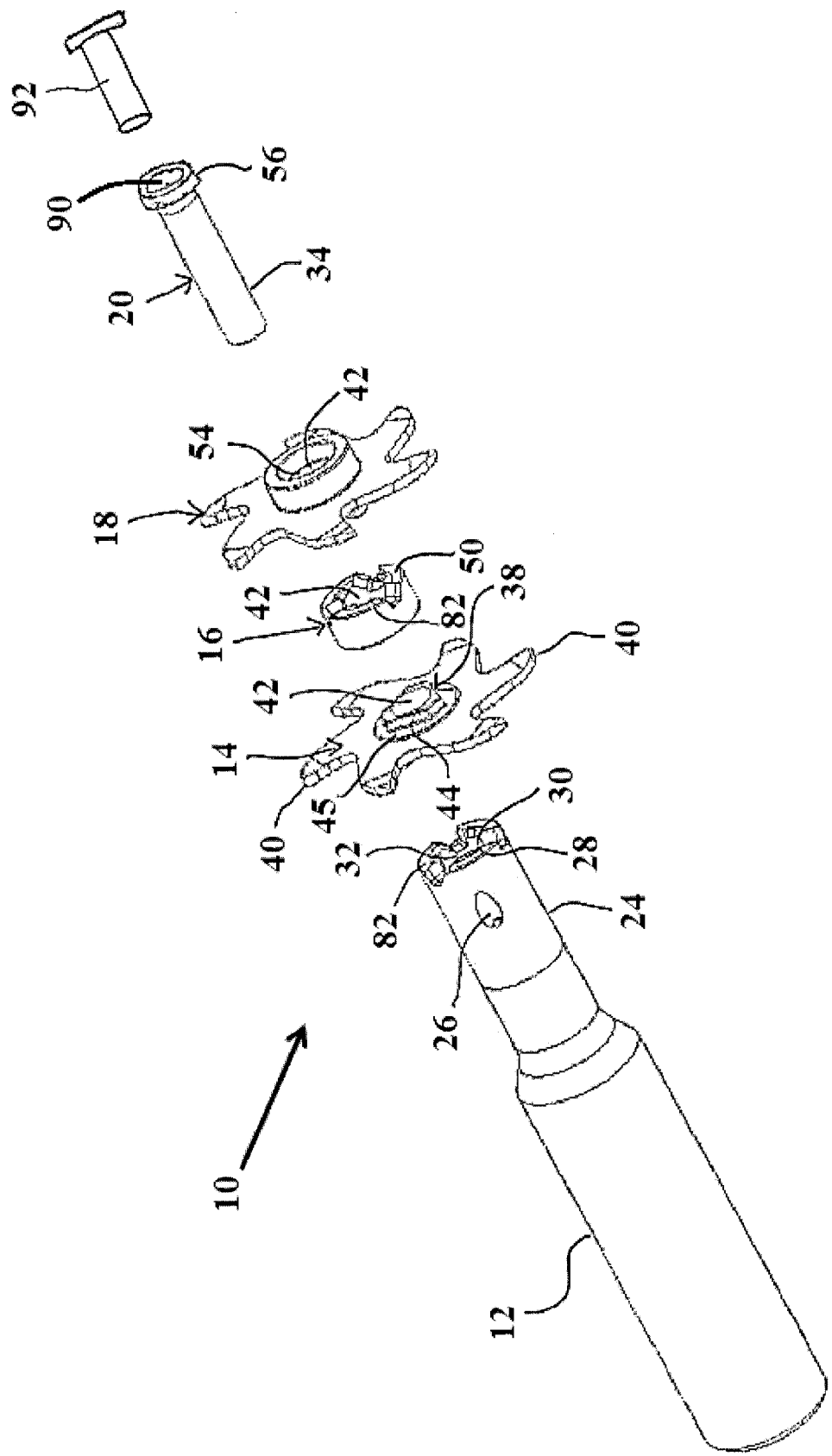
FIG. 1B shows an exploded representation of an embodiment of the cutting tool comprising holder, first cutting insert, spacer element, second cutting insert, a fastening element, and a second fastening element.
Figure 2A:
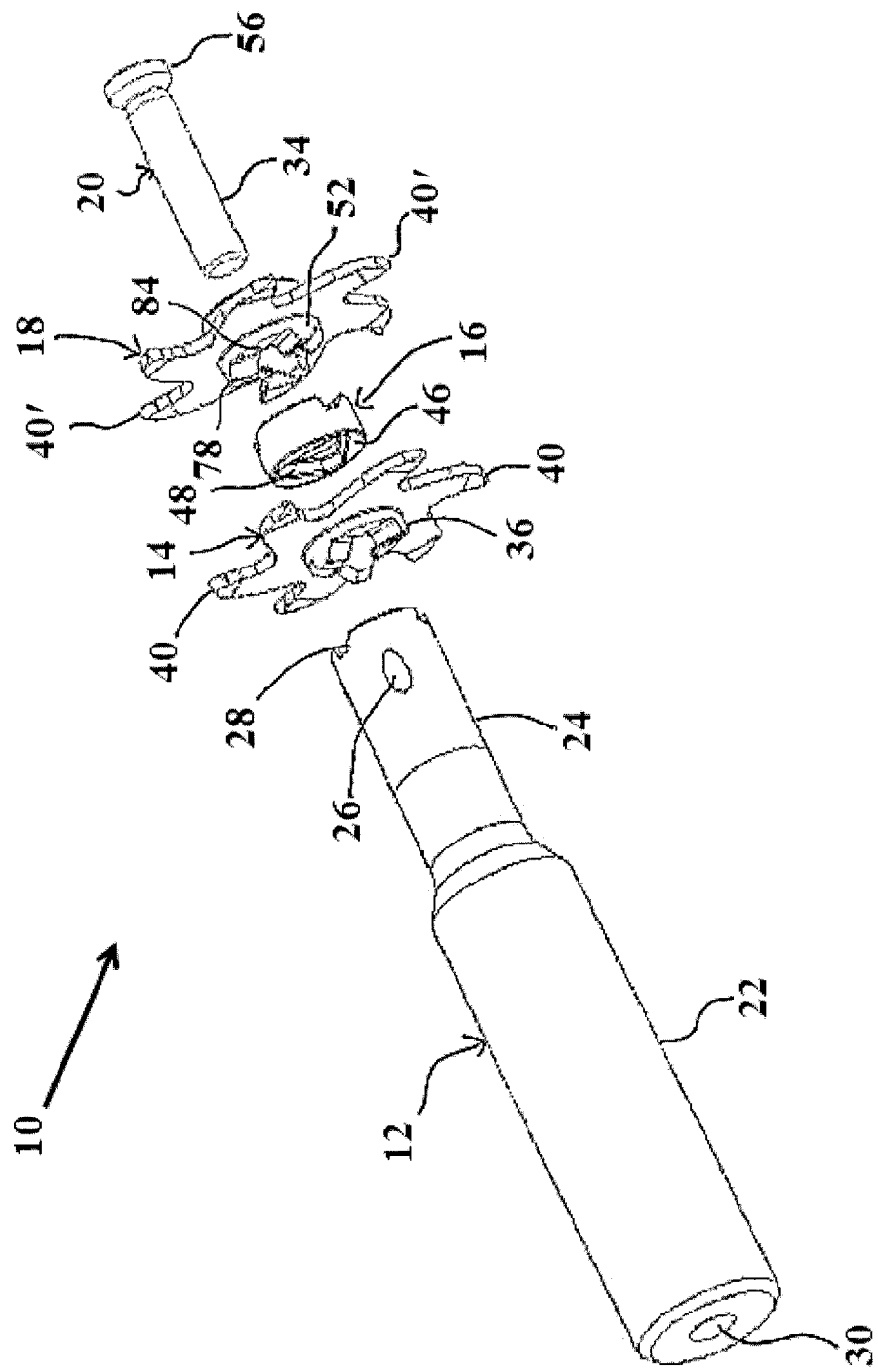
FIG. 2A shows an exploded representation similar to FIG. 1B from another perspective.
Figure 2B:
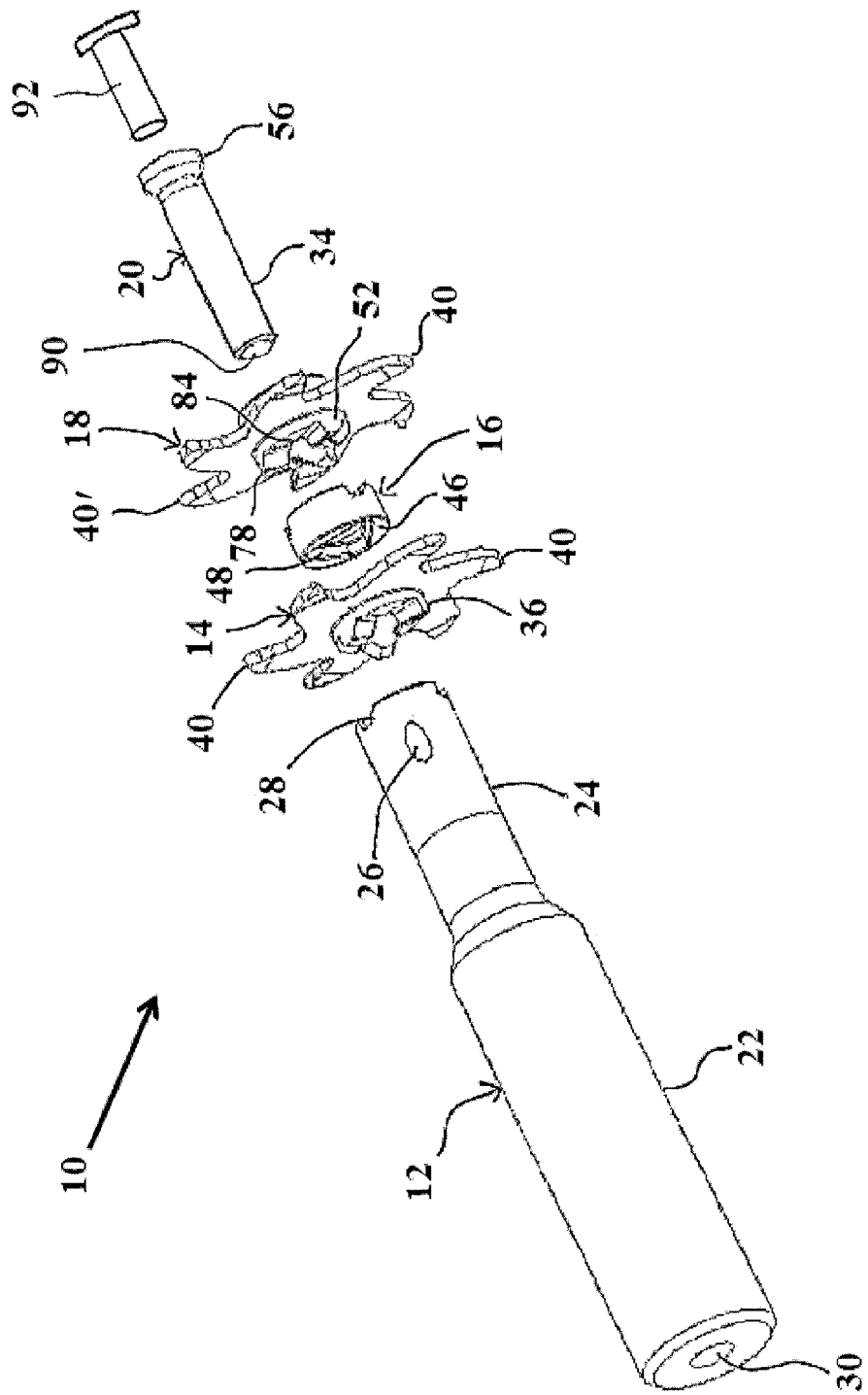
FIG. 2B shows an exploded representation similar to FIG. 1B from another perspective.

In a specific embodiment, referring to FIG. 1B and FIG. 2B, the fastening element has an inner bore 90 for the supply of coolant and/or for the lead-through of a second fastening element 92.

FIG. 3 and FIG. 4 show two lateral views of an inventive cutting tool 10 in the assembled state. In addition to the component parts already illustrated in FIGS. 1A and 2A, the grooves 66 of the first interface 28 and of the fifth interface 50, as well as the complementarily configured ribs 78 of the second and sixth interface 36, 52, are here represented. The first and the fifth interface 28, 50 are of the same design, as are the thereto corresponding second and sixth interface 28, 52. The first interface 28 is here, however, arranged slightly twisted relative to the fifth interface 50 about the holder longitudinal axis. The result is that also the second and sixth interface 36, 52, and thus the first and second cutting insert 14, 18, are arranged twisted relative to each other about the holder longitudinal axis.

FIG. 5 shows a top view of the cutting tool 10 from the side facing toward the workpiece. It can be seen that the cutting elements 40, 40' of the first and second cutting insert 14, 18 have an offset relative to each other. The mutually offset arrangement of the cutting elements 40, 40' is a preferred embodiment, since a more even force distribution is obtained during the machining It is equally also conceivable, however, that in another embodiment the first and the fifth interface 28, 50 are not twisted relative to each other, and that the cutting elements of the first and second cutting insert 14, 18 thus also have no offset.

Figure 6:
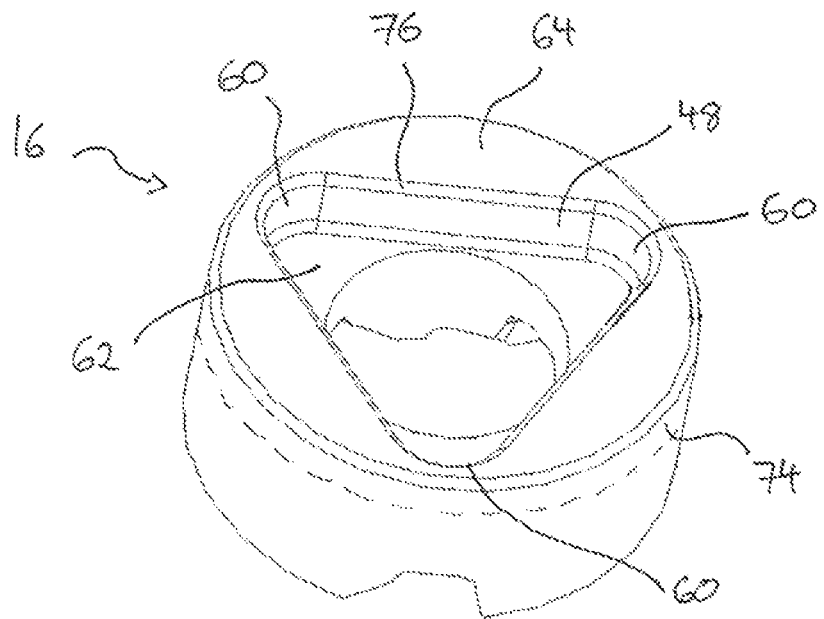
FIG. 6 shows a view of that side of the spacer element which is facing toward the workpiece.

FIG. 6 shows the side of the spacer element 16 which is facing toward the holder 12. The fourth interface 46, shown at the top in the figure, has three inwardly directed radial contact surfaces 48 (only one of which is visible in the figure). The three radial contact surfaces 48 are connected to one another by three rounded corner pieces 60. Moreover, the fourth interface 46 has an inner axial surface 62 and an outer axial surface 64. The supporting of a further interface coupled to the fourth interface 46 is here realized via the outer axial surface 64.

The transition between the inwardly directed radial contact surfaces 48 and the outer axial surface 64 is configured in the form of a beveled surface (bevel) 76, which extends also along the round corner piece 60. The bevel 76 facilitates the coupling with a corresponding interface, but is otherwise not fundamental to the interface characteristics of the fifth interface.

On the side facing toward the holder 12, the spacer element 16 can be shortened in length in the axial region 74 (for example rubbed down, turned or sawn off) without the interface characteristics of the fourth interface 46 being substantially changed thereby. The axial extent of the axial region 74 is here dependent on the axial extent of the region in which the interface has only radial faces.

The third interface 38 corresponding to the fourth interface 46 has three axially projecting, outwardly directed radial contact surfaces 44 (shown in FIG. 1A-1B). The height of these contact surfaces 44 in the axial direction is here less than the height of the inwardly directed radial contact surfaces 48 of the fourth interface 46. In the assembled state, the inwardly directed contact surfaces 48 thus fully enclose the outwardly directed contact surfaces 44.

Figure 7:
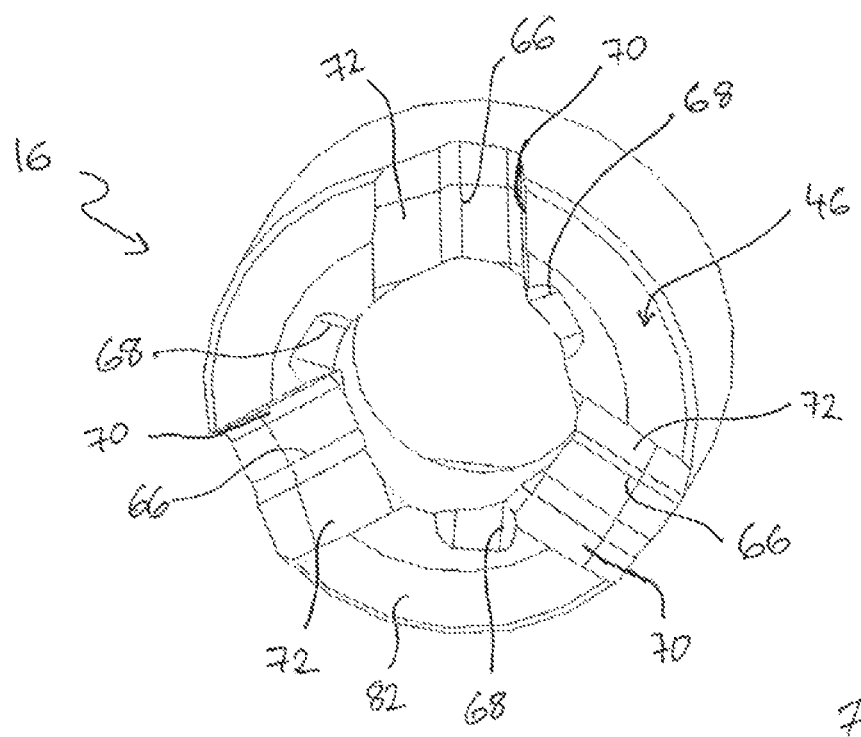
FIG. 7 shows a view of that side of the spacer element which is facing away from the workpiece.

FIG. 7 shows the side of the spacer element 16 which is facing away from the workpiece. The fifth interface 50, visible in the figure, has three grooves 66, three secondary grooves 68 and three axial surfaces 82. Each groove 66 has inclined side faces 70, 72, the side faces 72 being more steeply inclined and being provided as torque driving surfaces. An interface corresponding to the fifth interface 50 has three corresponding ribs 78 (represented in FIGS. 2A-2B).

The axial surfaces 82 are not necessarily intended for contact with a corresponding surface of the sixth interface 52. The load-bearing regions are instead formed merely by part-surfaces on the side walls of the grooves 66 of the fifth interface 50. A small gap thus remains between the axial surface 82 and an opposite axial surface 84 on the sixth interface 52. This simplifies production because, unlike a full-faced contact against the axial surface 82, only the smaller load-bearing regions on the grooves 66 have to be produced within narrow tolerances. In other words, the accuracy of the coupling realized with the fifth and sixth interface 50, 52 is not compromised by surface defects which may arise outside the limited load-bearing regions, should such faults be present on the axial surfaces 82 lying outside the load-bearing regions. Corresponding considerations apply to the opposite axial surface 84 on the sixth interface 52. These considerations are of particular importance in the production process, because the sintered blanks which form the hard metal cutting inserts are laborious to machine. The considerations which are here set out in relation to the fifth and sixth interface 50, 52 apply correspondingly, for example, to a first and second interface 28, 36.

In summary, a tool is presented which is simple to produce and easy to operate and with which double or multiple machinings can be made in one operation with high accuracy. With just two new components (a first cutting insert having two interfaces and a spacer element), an innovative tool which offers a significant work saving in the conductance of a plurality of, in particular similar, machining operations is obtained. With the proposed tool, a single workpiece can here be machined. It is also suitable, however, for simultaneously machining a plurality of workpieces, in that these are machined stacked in a pack. In addition, the tool can be constituted both by a rotary and by a stationary metal-cutting tool.

The invention claimed is:

1. A cutting tool for machining a workpiece, comprising:
a holder,
wherein the holder comprises:
a central holder bore that extends along a longitudinal axis; and
a first interface that is arranged at a front end of the holder;
a first cutting insert,
where in the first cutting insert comprises:
a second interface,
wherein the second interface is arranged at a rear side of the first cutting insert and corresponds to the first interface, and
wherein the second interface couples the first cutting insert to the holder; and
a third interface,
wherein the third interface is arranged at a top face of the first cutting insert opposite the rear side of the first cutting insert;
a spacer element,
wherein the spacer element comprises:
a fourth interface,
wherein the fourth interface is arranged at a rear side of the spacer element and corresponds to the third interface, and
wherein the fourth interface couples the spacer element to the first cutting insert, and
wherein the fourth interface comprises:
at least one radial contact surface, which runs parallel to the longitudinal axis; and
a substantially flat axial contact surface; and
a fifth interface,
wherein the fifth interface is arranged at a top face of the spacer element opposite the rear side of the spacer element;
a second cutting insert,
wherein the second cutting insert comprises:
a sixth interface,
wherein the sixth interface is arranged at a rear side of the second cutting insert and corresponds to the fifth interface, and
wherein the sixth interface couples the second cutting insert to the spacer element; and
at least one fastening element,
wherein the at least one fastening element fastens together the first cutting insert, the second cutting insert, the spacer element, and the holder,
wherein each of the first cutting insert, the second cutting insert, and the spacer element have a central bore, coaxial to the central holder bore, for the reception of the at least first fastening element,
wherein the first interface and the fifth interface are a first type of interface,
wherein the third interface is a second type of interface that is different from the first type of interface,
where the second type of interface does not correspond to the first type of interface,
wherein the fourth interface is configured to engage the third interface with the at least one radial contact surface of the fourth interface to fix the spacer element in a radial direction that is perpendicular to the longitudinal axis,
wherein the fourth interface is configured to engage the third interface with the substantially flat axial contact surface of the fourth interface to fix the spacer element in an axial direction that is parallel to the longitudinal axis, and
wherein the spacer element can be shortened at the rear side of the spacer element, such that the fourth interface continues to correspond to the third interface.

2. The cutting tool as claimed in claim 1,
wherein the at least one radial contact surface of the fourth interface comprises three radial contact surfaces, and
wherein the three radial contact surfaces run at an angle of 60° to one another.

3. The cutting tool as claimed in claim 2,
wherein the third interface comprises three second radial contact surfaces that correspond to the three radial contact surfaces of the fourth interface and are configured to contact the three radial contact surfaces of the fourth interface, when the spacer element is fastened to the first cutting insert.

4. The cutting tool as claimed in claim 1,
wherein the substantially flat axial contact surface of the fourth interface is arranged perpendicular to the longitudinal axis.

5. The cutting tool as claimed in claim 1,
wherein the first interface and the fifth interface are placed twisted relative to each other about the longitudinal axis.

6. The cutting tool as claimed in claim 1,
wherein the central holder bore has an internal thread,
wherein the fastening element is a screw having an external thread,
wherein the external thread corresponds to the internal thread, and wherein the central bores of the first cutting insert, the second cutting insert, and the spacer element are through bores.

7. The cutting tool claimed in claim 1,
wherein the cutting tool comprises:
 a plurality of spacer elements; and
 a plurality of first cutting inserts,
 wherein the plurality of spacer elements and the plurality of first cutting inserts are arranged next to each other in an alternating manner.

8. The cutting tool claimed in claim 1,
wherein the fastening element has an inner bore for the supply of a cooling liquid.

9. The cutting tool claimed in claim 1,
wherein the fastening element has an inner bore for the lead-through of a second fastening element.

10. The cutting tool as claimed in claim 1,
wherein the first interface has three radially aligned grooves and the second interface has three ribs corresponding thereto.

11. The cutting tool as claimed in claim 10,
wherein each of the three radially aligned grooves has a first inclined side face and a second inclined side face,
wherein the second inclined side face is more steeply inclined than the first inclined side face.

12. A cutting insert for a cutting tool having a holder with a first interface that is arranged at a front end of the holder, comprising:
 a second interface,
 wherein the second interface is arranged at a rear side of the cutting insert and corresponds to the first interface of the holder,
 wherein the second interface is configured to couple the cutting insert to the holder;
 a third interface,
 wherein the third interface is arranged at a top face of the cutting insert opposite the rear side of the cutting insert,
 wherein the third interface is configured to couple the cutting insert to a corresponding fourth interface;
 a central through bore that extends along a longitudinal axis of the cutting insert; and
 at least one cutting element arranged on a periphery of the cutting insert,
 wherein the second interface corresponds to a first type of interface and the third interface is a second type of interface that is different from the first type of interface,
 wherein the second type of interface does not correspond to the first type of interface, and
 wherein the third interface comprises:
  at least one radial contact surface, which runs parallel to the central through bore, and
  a substantially flat axial contact surface, which is arranged perpendicular to the longitudinal axis.

13. A spacer element for a cutting tool having a holder, a first and a second cutting insert, wherein the holder has a first interface that is arranged at a front end of the holder, wherein the first cutting insert has a second interface, which is arranged at a rear side of the first cutting insert and corresponds to the first interface of the holder, and a third interface that is arranged at a top face of the first cutting insert opposite the rear side of the first cutting insert, and wherein the second cutting insert has a sixth interface, which is arranged at a rear side of the second cutting insert, the spacer element comprising:
 a fourth interface,
 wherein the fourth interface is arranged at a rear side of the spacer element and corresponds to the third interface,
 wherein the fourth interface is configured to couple the spacer element to the first cutting insert;
 a fifth interface,
 wherein the fifth interface is arranged at a top face of the spacer element opposite the rear side of the spacer element,
 wherein the fifth interface is configured to couple the spacer element to the second cutting insert; and
 a central through bore that extends along a longitudinal axis of the spacer element;
 wherein the fifth interface is a first type of interface and the fourth interface corresponds to a second type of interface that is different from the first type of interface,
 wherein the second type of interface does not correspond to the first type of interface,
 wherein the fourth interface comprises:
  at least one radial contact surface, which runs parallel to the longitudinal axis, and
  a substantially flat axial contact surface, which fixes the spacer element in axial direction such that the spacer element can be shortened at its rear side, such that the fourth interface continues to correspond to the third interface.

* * * * *